United States Patent
Sørgård et al.

(10) Patent No.: US 8,200,939 B2
(45) Date of Patent: Jun. 12, 2012

(54) MEMORY MANAGEMENT UNIT IN A MICROPROCESSOR SYSTEM

(75) Inventors: Edvard Sørgård, Trondholm (NO);
Jørn Nystad, Trondholm (NO);
Androas Due Engh-Halstvedt,
Trondholm (NO)

(73) Assignee: ARM Norway AS, Trondheim (NO)

( * ) Notice: Subject to any disclaimer, the term of this patent is extended or adjusted under 35 U.S.C. 154(b) by 769 days.

(21) Appl. No.: 12/068,009

(22) Filed: Jan. 31, 2008

(65) Prior Publication Data
US 2009/0198893 A1 Aug. 6, 2009

(51) Int. Cl.
*G06F 12/00* (2006.01)

(52) U.S. Cl. ............... 711/206; 711/E12.058

(58) Field of Classification Search .............. None
See application file for complete search history.

(56) References Cited

U.S. PATENT DOCUMENTS

| | | | | |
|---|---|---|---|---|
| 5,016,169 A * | 5/1991 | Koya et al. | ............. | 711/203 |
| 5,644,752 A * | 7/1997 | Cohen et al. | ............. | 711/122 |
| 6,216,200 B1 * | 4/2001 | Yeager | ............. | 711/100 |
| 6,259,460 B1 | 7/2001 | Gossett | | |
| 6,260,131 B1 * | 7/2001 | Kikuta et al. | ............. | 711/210 |
| 6,650,333 B1 * | 11/2003 | Baldwin | ............. | 345/552 |
| 7,454,590 B2 * | 11/2008 | Jordan et al. | ............. | 711/207 |
| 7,774,531 B1 | 8/2010 | Karlsson | | |
| 7,814,292 B2 * | 10/2010 | Tsien | ............. | 711/202 |
| 2003/0165147 A1 * | 9/2003 | Shimada | ............. | 370/412 |
| 2005/0002371 A1 * | 1/2005 | Andersen | ............. | 370/346 |
| 2005/0044319 A1 * | 2/2005 | Olukotun | ............. | 711/118 |
| 2006/0184753 A1 * | 8/2006 | Jeter et al. | ............. | 711/154 |
| 2007/0050601 A1 | 3/2007 | Chaudhry et al. | | |
| 2007/0067505 A1 * | 3/2007 | Kaniyur et al. | ............. | 710/22 |
| 2007/0106874 A1 * | 5/2007 | Pan et al. | ............. | 711/206 |
| 2008/0320230 A1 | 12/2008 | Vishin et al. | | |

OTHER PUBLICATIONS

Related U.S. Appl. No. 12/068,010, filed Jan. 31, 2008; Inventor: Nystad et al.
Related U.S. Appl. No. 12/068,012, filed Jan. 31, 2008; Inventor: Nystad et al.
Office Action mailed Jul. 9, 2010 in co-pending U.S. Appl. No. 12/068,010.
Office Action mailed Jul. 9, 2010 in co-pending U.S. Appl. No. 12/068,012.
D. Kim et al, "An SoC With 1.3 Gtexels/s 3-D Graphics Full Pipeline for Consumer Applications" IEEE Journal of Solid-State Circuits, vol. 41, No. 1, Jan. 2006, pp. 71-84.
H. Igehy et al, "Prefetching in a Texture Cache Architecture" 1998, Eurographics/SIGGRAPH Workshop on Graphics Hardware.

(Continued)

*Primary Examiner* — Edward Dudek, Jr.
*Assistant Examiner* — John P Fishburn
(74) *Attorney, Agent, or Firm* — Nixon & Vanderhye P.C.

(57) ABSTRACT

A memory management arrangement includes a memory management unit, a cache memory and a queue arrangement. The queue is a first-in, first-out (FIFO) buffer which can queue failed memory access requests and return them as inputs to the memory management unit via the bus 5 for retrying through the memory management unit at a later time. If a memory access request sent to the memory management unit experiences a cache "miss", instead of blocking memory access requests until the required address data has been loaded into the cache, the memory management unit operates to place the failed memory access request in the replay queue, and allows subsequent memory access requests to continue. The failed memory access requests in the queue are then continuously circulated through the memory management unit from the queue alternately with new memory access requests from other access initiators.

24 Claims, 1 Drawing Sheet

OTHER PUBLICATIONS

D. Blythe, "The Direct3D 10 System" 2006, ACM.
"Cray MTA" http://www.cmf.nrl.navy.mil/CCS/help/mta/ 2002.
R. Rajwar et al, "Speculative Lock Elision: Enabling Highly Concurrent Multithreaded Execution" Micro '01, Dec. 2001.
A. Ho et al, "On deadlock, livelock, and forward progress" Technical Report No. 633, University of Cambridge Computer Laboratory, May 2005, pp. 1-8.
T. Li et al, "Spin Detection Hardware for Improved Management of Multithreaded Systems" IEEE Transactions on Parallel and Distributed Systems, vol. 17, No. 6, Jun. 2006, pp. 508-521.
S. Abdelwahed et al, "Blocking Detection in Discrete Event Systems" 6 pages.
Office Action mailed Jan. 31, 2011 in co-pending U.S. Appl. No. 12/068,010.
Office action mailed Feb. 8, 2011 in co-pending U.S. Appl. No. 12/068,012.
Office Action mailed Nov. 1, 2011 in co-pending U.S. Appl. No. 12/068,010.

* cited by examiner

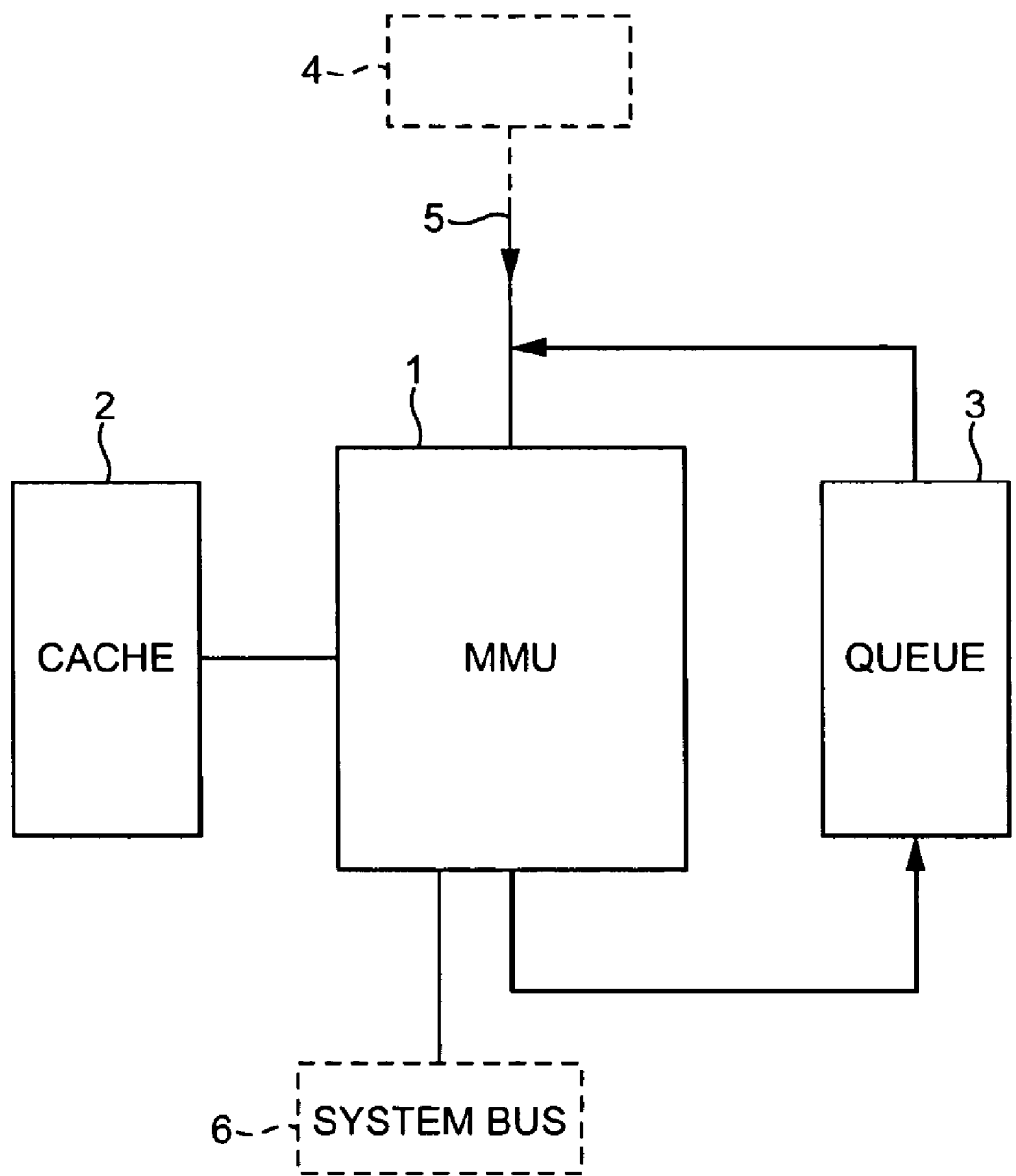

MEMORY MANAGEMENT UNIT IN A MICROPROCESSOR SYSTEM

The technology described in this application relates to microprocessor systems and in particular to the operation of memory management units in microprocessor systems.

Many microprocessor systems include memory access arrangements in which the address used in a given memory access request is translated from a virtual memory address seen by the memory access initiator (the unit requesting the memory access) to a corresponding physical memory address used by the memory system.

These functions are typically carried out in a functional unit known as a "memory management unit" (MMU). The MMU has the twin tasks of memory address translation and memory protection. Each and every access to memory must go through the MMU in order to check if the access should be allowed, and to translate the (virtual) address used in the access request by the access originator to the corresponding physical address used by the memory system.

In order to facilitate such operation, the MMU will have access to configuration (address association) data which maps virtual addresses used in memory accesses to corresponding physical memory addresses. When an access request is received, the MMU consults this configuration data to find the relevant physical memory address. The address configuration data is typically stored in memory in the form of page tables.

As accessing the configuration data in memory can take time, it is known for MMU arrangements to include a cache memory, often referred to as a Translation Lookaside Buffer (TLB), in which recently used address configuration data (page table elements) is stored, so as to allow faster access to that data and thereby speed up the address translation and checking process.

However, notwithstanding this, an MMU can receive memory access requests that require address configuration data (page table entries) that is not currently in the cache (in the TLB). In this case, as is known, a so-called cache "miss" will occur and the MMU must then read (fetch) the relevant address configuration data from other memory, such as host system memory, and load the read (fetched) data into the cache memory, before it can serve (complete) the memory access request that "missed".

In some memory access arrangements, if such a cache miss occurs, subsequent memory accesses are blocked from proceeding until the "missed" (failed) access has been completed (resolved). However, this has the disadvantage that no further memory accesses can proceed until the access that "missed" has been resolved.

It is known therefore in some memory management arrangements to set aside memory accesses that cause a cache miss, by storing them in some kind of buffer arrangement for later resolution, and to then allow subsequent memory accesses to proceed. This avoids blocking or stalling the memory access process whenever a memory management unit cache miss occurs.

In these arrangements, memory accesses that cause a cache miss are stored in a buffer arrangement until the relevant address configuration data (page table entry) has been fetched from memory. The fetched address configuration data is then used to serve the appropriate memory accesses that are stored in the buffer directly. (This is so as to speed the resolution of the set-aside, failed accesses, as it is usually thought desirable to reduce the latency of any memory accesses so far as is possible.)

However, that there remains scope for improvements to memory management arrangements in microprocessor systems.

According to a first aspect, there is provided a method of operating a memory management unit in a microprocessor memory system, in which the memory management unit acts to translate virtual addresses used in memory accesses to physical addresses used by the memory system and has access to a cache memory storing associations between virtual addresses and physical addresses for this purpose, the method comprising:

the memory management unit:

receiving a memory access request;

determining whether the necessary address association data for performing an address translation required for the memory access request is stored in the cache memory; and if the address association data is not stored in the cache memory, placing the memory access request in a first-in, first-out queue for later return to the memory management unit for processing.

According to a second aspect, there is provided a memory management unit arrangement for a microprocessor memory system, comprising:

a memory management unit for translating virtual addresses used in memory access requests to physical addresses used by the memory system;

a cache memory for storing associations between virtual addresses and physical addresses for use by the memory management unit when translating virtual addresses used in memory access requests to physical addresses used by the memory system; and a first-in, first-out queue arrangement for receiving and queuing memory access requests from the memory management unit and for returning requests in the queue to the memory management unit for processing; wherein:

the memory management unit further comprises:

means for receiving a memory access request;

means for determining whether the necessary address association data for performing an address translation required for the memory access request is stored in the cache memory; and means for, if the address association data is not stored in the cache memory, placing the memory access request in the first-in, first-out queue for later return to the memory management unit for processing.

The technology described in this application provides a memory management arrangement in which a memory management unit is used to perform address translations between virtual addresses used in memory access requests and physical addresses of the memory system. If the memory management unit cannot resolve a memory access it receives (i.e. a cache "miss" occurs), it places the memory access request in a first-in, first-out queue for later returning to the memory management unit for processing.

In other words, the system and method use and include a queue to which failed memory access requests are sent, and from which they are returned to the memory management unit to be retried (replayed). Thus the technology described in this application effectively uses a serial retry (replay) queue for handling failed memory access requests.

As will be discussed further below, this arrangement has a number of advantages.

Firstly, sending memory access requests that cache "miss" to a queue to be retried later avoids the need to block or stall the memory management unit operation until the missed access is resolved. Thus the technology described in this application provides a mechanism for having a memory management unit arrangement that can allow other memory accesses to be handled while one or more other memory accesses are waiting for their cache "misses" to be resolved.

Secondly, because any "missed" memory access requests are placed in a queue for later retry through the memory management unit, there is no need for more complex arrangements to allow resolution of "missed" memory access requests outside of or in addition to the basic memory management unit arrangement.

Furthermore, placing "missed" memory access requests in a first-in, first-out queue for retrying through the memory management unit avoids the need for any complex buffering and missed access resolution and selection arrangements.

The technology described in this application accordingly provides, inter alia, a relatively straightforward, cost-effective, and robust system for providing a memory management unit arrangement for a microprocessor memory management unit arrangement that can allow other memory accesses to be handled while one or more other memory accesses are waiting for their cache "misses" to be resolved. Indeed, a first-in, first-out queuing arrangement is advantageously used to resolve missed memory access requests in a memory management system, even though more sophisticated schemes may on the face of it appear more desirable.

The memory management unit can be any suitable and desired such unit. It should, as will be appreciated by those skilled in the art, be operable to receive memory access requests, e.g., from requesting units of a microprocessor system (from "access initiators"), e.g., and preferably, via a bus or buses to which the memory management unit and access initiating unit(s) are coupled, and to in response thereto perform any necessary (virtual to physical) address translations and address checking to allow the memory access request to proceed (or not, as appropriate).

The memory management unit should also be able to access the cache memory to retrieve address association data it requires, and be able to recognise when data it requires is not present in the cache memory and in response thereto trigger the fetching of the relevant data (e.g. and preferably, a page table entry) from other memory and the storing of that data in the cache memory.

In a preferred example embodiment, if the memory management unit has started to fetch data (e.g. a page table entry) for the cache memory in response to a "missed" access, and the "missed" access is returned to the memory management unit and retried (from the queue) before the data has been fetched (is available in the cache memory), then the memory management unit does not trigger a new fetch of the data (e.g. does not request the same page table entry again). This is preferably achieved by checking if the data (e.g. page table entry) in question has already been requested but not yet received, and/or by identifying and merging (or in some other way handling) the identical entries in the cache (that would be) caused by such multiple requests for the same data.

It is also preferred for the rate at which data in the cache (e.g. page table entries) can be replaced to be restricted. This may help to avoid a "livelock" situation in which fetched data is replaced in the cache by new data before it can be used.

The memory management unit preferably places any failed memory access requests (memory access requests that trigger a cache miss) in the retry queue of the system. In other words, the memory management unit will receive as an input a memory access request, and attempt to perform any required address translation for the memory access request using the address association data stored in the cache memory, but if it finds that the address data it needs is not present in the cache memory (i.e. a cache miss occurs), it will then place the memory access request in the retry queue for trying again later.

It should be noted here that this operation of the memory management unit in respect of a given input memory access request applies to all input memory access requests whether they are new memory access requests from another access initiator (requesting unit) of the microprocessor system, or whether they are requests from the retry queue that are being returned to the memory management unit to be tried again. Thus, for example, and in particular, if a previously failed memory access request is sent from the queue through the memory management unit but fails again, that access request will be placed by the memory management unit back in the queue (at the end of the queue) so that is can be tried again in due course (when it reaches the head of the queue).

The cache memory can similarly be any suitable and desired such memory. Thus it should, as is known in the art, comprise a memory arrangement that is "local" to and relatively rapidly accessible by the memory management unit (at least compared to other memory). In the case of a page-table-based MMU, it should comprise a translation lookaside buffer (TLB), for example.

The address association data can similarly be stored in the cache memory in any desired and suitable form.

The first-in, first-out retry queue may also be arranged and configured in any suitable and desired manner. As discussed above, it should be configured to receive and queue on a first-in, first-out basis "failed" memory access requests from the memory management unit, and to be able to return those memory access requests as inputs to the memory management unit from the head of the queue on a first-in, first-out basis.

The queue should accordingly be able to store failed memory access requests in a suitable form for this purpose and to provide the queued requests as inputs to the memory management unit. The queue is accordingly preferably coupled to the same communications arrangements (e.g. bus) as other access initiators (requesters), so that it can re-input queued "failed" memory access requests to the memory management unit in a similar manner. (It will be appreciated here that the queued, failed memory access requests in the retry queue are returned to the memory management unit in serial order from the head of the queue, i.e. on a first-in, first-out basis, as that is the nature of the retry queue.)

The retry queue is preferably configured as a basic FIFO arrangement. The queued requests are preferably queued without gaps between them (without gaps in the queue), but this is not essential, and the queue can be allowed to include gaps, if desired.

The data that is stored in respect of any queued memory access can similarly be any suitable and desired such data. It preferably comprises the memory address in the access (that the access relates to), together with, if appropriate, any attributes of the access that are required (such additional attributes could depend on the implementation of the memory management system, for example). In a preferred embodiment, the stored data includes one or more of: an identifier (ID) for the memory access requestor (to be used, e.g., to ensure data is delivered to the correct requestor and/or to help ensure ordering requirements, if any); the size of the access request (e.g. in terms of the bytes of data being requested); and whether the memory access is a read or write access (in a preferred embodiment, read and write accesses can be allowed or denied separately).

The first-in, first-out queue may be arranged to have any desired maximum length (to be able to queue (store) any desired number of "failed" memory access requests), but the allowed length of the queue will be a trade-off between latency requirements and the risk of potentially having to block the processing of new memory access requests.

For example, the longer the queue, the longer it may take for any given access request in the queue to reach the head of the queue and thereby be retried, such that the overall latency of servicing a given memory access request will tend to increase, but the more failed memory access requests the queue can "queue" before it becomes "full" (i.e. before the point is reached at which any newly failing memory access requests will have to lead to stalling or blocking of new memory access requests), and thus the greater throughput that can be achieved.

There may be a suitable maximum queue length or lengths for any given memory management unit arrangement that will provide a suitable trade-off or compromise between latency considerations for completing failed (queued) memory accesses and maintaining reasonable non-blocking operation of the memory management unit.

In general the length of the queue may therefore be selected and based on the intended implementation of the memory management unit. For example, the maximum queue length could be based on the maximum number of memory access requests that can be generated in the system before a memory access request has to be serviced (and set to less than this number).

It will be appreciated that in many situations there may at one time be both failed memory access requests in the retry queue awaiting servicing by the memory management unit, and new, "external" memory access requests (from other access initiators) requiring servicing by the memory management unit. Thus, a preferred embodiment includes means for or a step of selecting either a queued memory access request awaiting retrying, or a new memory access request sent to the memory management unit, for providing to the memory management unit for processing. In other words, the memory management unit will be able to receive as an input a new memory access request, or a queued, previously failed, memory access request, and the system can and will select which memory access request is sent to the memory management unit next.

Such selection of the memory access request to send to the memory management unit can be carried out as desired, and, for example, be based on any desired and suitable criteria. For example, memory accesses to provide to the memory management unit could be chosen alternatively from new memory accesses and from the retry queue, or memory accesses could be chosen preferentially from the retry queue (if it is generally preferred to try to resolve failed accesses as quickly as possible), e.g., and preferably, such that new memory accesses are only sent to the memory management unit if there is a gap in the retry queue.

Preferably a dynamic selection scheme is used. Most preferably memory accesses are provided alternately from the retry queue (where the queue includes some accesses) and from the new memory accesses, until (and unless) the retry queue is full, in which case the retry queue is then given priority (i.e. only queued access are sent to the memory management unit), e.g., and preferably, until there is again a space (or a particular, preferably selected, preferably predetermined amount of space) in the retry queue.

In one preferred embodiment, any queued, failed, memory access requests are continuously returned to the memory management unit for retrying as and when they reach the head of the queue (and it is, e.g., the turn of a queued memory access request to be sent to the MMU).

In another preferred embodiment this is not done, but instead failed memory access requests in the retry queue are only returned to the memory management unit for retrying once a new set of address association data has been loaded in the cache memory.

In this case, if a memory access request has been tried and failed and placed in the retry queue, it is thus preferably not tried again from the queue until there is a change in the address association data stored in the cache memory (until new address association data has been stored in the cache memory).

This has the advantage that failed memory accesses will only be tried again once the content of the cache memory has changed (such that there is then a possibility that failed access can now be serviced). This may reduce the number of times each failed memory access in the queue needs to be retried before it is resolved, particularly in systems where the memory latency is high (since it may avoid retrying failed memory accesses while the cache memory cannot contain the data needed to resolve them (since it has yet to be updated)).

Thus, in one particularly preferred embodiment, failed memory access requests are queued in the retry queue (i.e. retained in the retry queue without returning them to the memory management unit until for retrying) until new address association data has been loaded into the cache memory, and then, preferably, any queued memory access requests are returned to the memory management unit for retrying.

Thus, in a particularly preferred but still example embodiment, when new address association data (e.g. a new page table entry) has been loaded in the cache memory, a memory access request or memory access requests in the retry queue is/are sent to the memory management unit for attempted processing.

In these cases, once there is new data in the cache memory, the memory access requests in the retry queue are preferably given priority for returning to the memory management unit, ahead of any new memory access requests.

Most preferably, once all the memory access requests existing in the retry queue at the time the new address data is loaded into the cache memory have been sent to the memory management unit (have been tried) once, any remaining failed memory access requests (e.g. if they have been returned to the queue after retrying) are not sent to the memory management unit again until new address data is loaded in the cache memory.

Thus, in a particularly preferred embodiment, upon a change in the data in the cache memory, any existing queued, failed memory access requests are tried through the memory management unit (to see if the new data can service any of the queued requests), but once all those queued requests have been tried, only new memory access requests (i.e. not from the queue) are sent to the memory management unit until new data is loaded into the cache, at which point the queued requests will be tried, and so on.

Similarly, it is preferred that at each change of address association data in the cache memory, the retry queue is run through the memory management unit once, and then failed memory access requests are queued without retrying them until new address association data is loaded into the cache, at which point the queue is run through again, and so on.

When in these arrangements the queued memory access requests are to be sent to the memory management unit for retrying, then in a particularly preferred embodiment the memory access requests in the retry queue are given priority, and, most preferably, are sent to (through) the memory management unit in turn, in a contiguous sequence (i.e. one after another without interruption by new, non-queued access requests). This should allow any failed accesses that require the new data to complete as quickly as possible. However, other arrangements, such as alternating new and queued failed memory access requests until all the existing queued access requests have been tried could be used if desired.

As will be appreciated from the above, the MMU operation may result in memory access requests being serviced by the memory management unit in an order that is different to the order in which the memory access requests were originally sent to the memory management unit (since a queued request will be delayed in its processing and thus processed out of sequence).

In many cases such out-of-order processing (reordering of the memory accesses) will not have any effect, but there may be some circumstances in which the order of the processing needs to be maintained and so in a preferred, example embodiment, the order of memory access requests received by the memory management unit is retained or restored.

In a particularly preferred example embodiment, the memory management unit can determine if a memory access request it is processing has an ordering requirement relative to other memory access requests, and if it does, determine whether the memory access request if it were to be processed, would be processed in its right place in the order. If the memory management unit determines that the memory access request is in its right place in the order it can process the memory access request normally, but if it determines that the memory access request is out of order, it preferably does not process the memory access request but instead places it in the retry queue, like for a "failed" request (irrespective of whether it could actually service the access request at that time).

This has the effect that an out-of-order memory access request is not processed (even if it can be) but is instead deferred (by placing it in the retry queue). Such deferral can then allow other memory access requests to be performed in advance of the deferred access request, to thereby preserve the order of the access requests. In effect, a memory access request that is out-of-order is "disallowed", even if it could be serviced, so that the order can be preserved.

Thus, in a particularly preferred embodiment, the memory management unit can determine if a memory access request it receives for processing would be completed in the correct order (with respect to other memory access requests sent or to be sent to the memory management unit) if it were to be completed by the memory management unit, and if it determines that the completion of the memory access request would not be in the correct order, it does not process (complete) the memory access request, but instead places it in the retry queue to be tried again later.

It is believed that deferring the processing of an out-of-order memory access request in this manner may be new and advantageous in its own right. Thus, according to a third aspect, there is provided a method of operating a memory management unit in a microprocessor memory system, in which the memory management unit acts to translate virtual addresses used in memory accesses to physical addresses used by the memory system and has access to a cache memory storing associations between virtual addresses and physical addresses for this purpose, the method comprising:

the memory management unit:

receiving a memory access request;

determining if the memory access request would be completed in the correct order if it were to be completed by the memory management unit; and, if it is determined that the completion of the memory access request would not be in the correct order, placing the memory access request in a first-in, first-out queue for later return to the memory management unit.

According to a fourth aspect, there is provided a memory management unit arrangement for a microprocessor memory system, comprising:

a memory management unit for translating virtual addresses used in memory access requests to physical addresses used by the memory system;

a cache memory for storing associations between virtual addresses and physical addresses for use by the memory management unit when translating virtual addresses used in memory access requests to physical addresses used by the memory system; and a first-in, first-out queue arrangement for receiving and queuing memory access requests from the memory management unit and for returning requests in the queue to the memory management unit for processing; wherein:

the memory management unit further comprises:

means for receiving a memory access request;

means for determining if the memory access request would be completed in the correct order if it were to be completed by the memory management unit; and means for, if it is determined that the completion of the memory access request would not be in the correct order, placing the memory access request in the first-in, first-out queue for later return to the memory management unit.

As will be appreciated by those skilled in the art, these example aspects and embodiments can include any one or more of the optional features described herein, as appropriate. Thus, for example, memory access requests are preferably also placed in the queue if they experience a cache miss.

It should be noted here that in these aspects and example embodiments, it is preferably the memory access request that is placed in the queue if the request needs deferring because it is "out-of-order", in the same manner as if a request "fails" (and not, e.g., the result of the request processing (e.g. the physical address)), as that is then consistent with the other queue entries, although other arrangements could be used, if desired, such as storing the result of the request processing. Similarly, there is no need to process a deferred request (other than to identify it as such and to send it to the queue), if desired.

The determination of whether a given memory access request is out-of-order or not can be carried out in any desired and suitable manner. In a particularly preferred embodiment, for a given set of memory access requests that have to be performed in order, each memory access request in the set is tagged with its (sequence) number in the order in the set when it is received at the memory management unit, and the number of the last completed memory access request in the set is tracked or monitored. Preferably, a comparison is then made between the number of a current memory access request for processing by the memory management unit, and the number of the last successfully completed memory access request of the set of memory access requests in question, to see if the current access request is the next one in the set (in which case it can be processed) or not (in which case it should be sent to the retry queue to defer its processing).

In a particularly preferred such embodiment, counters are used to tag memory access requests with their order number, and to track the completed access requests. Most preferably, a counter (an entry counter) is used to tag a memory access request with its order number (the current counter value) as it enters the memory management unit (with the counter then being incremented), and, similarly, a second counter (an exit counter) is used to count completed access requests as they leave the memory management unit (and is incremented each time a memory access request is completed). The second counter (the exit counter) will accordingly maintain a count of the last completed memory access request in the set, and so by comparing the counter value tagged to a current memory access request to be processed with the exit counter value, it can be determined whether the current memory access request is the next one in the order or not.

It will be appreciated that such an arrangement can be used to maintain the order of memory access requests for a given set of memory access requests. However, the Applicants have recognised that there can be arrangements in which there may be plural sets of memory access requests which each need to be in order within a given set, but which sets are effectively independent of each other (e.g. such that there is no need to preserve any ordering across the separate sets of accesses). An example of such an arrangement is the AMBA AXI bus protocol (as described, for example, in ARM publication IHI0022B-AMBA AXI Protocol 1.0 from arm.com) in which, as is known in the art, memory accesses with identical IDs (within the same "set" of accesses) need to be carried out in order.

Such arrangements can be handled by providing separate order counters, etc., in the above manner, for each individual set of accesses that need their order to be maintained. Thus, in a particularly preferred but still example embodiment, the system and method can track and handle plural sets of (ordered) memory access requests simultaneously. Preferably plural sets (pairs) of counters, etc., as discussed above, are provided for this purpose, with each set (pair) of counters tracking a given set of associated memory accesses. In this case, separate counts would be maintained for each set of memory access requests, and each memory access request would be assigned to the "count" for the set of memory access requests that it belongs to (e.g. tagged with the current entry counter value for its set of memory access requests).

Thus, in a preferred embodiment where there are plural disjoint sets of memory accesses to be serviced (i.e. such that there exists an ordering requirement between the members of any given set, but there does not exist any ordering requirement between members of different sets), then a counter pair is preferably assigned to each set of memory accesses.

In the case of the AXI bus protocol (as discussed above), each AXI ID is preferably considered to form two sets of memory accesses, one for write accesses, and one for read accesses (with the accesses within a set being required to complete in the order they were issued in). If the optional write reordering feature of the AXI bus protocol is not used, then preferably all write accesses of all IDs are merged into (treated as) a single set of write accesses.

It will be appreciated from the above, memory access requests are placed in the retry queue if they experience a cache miss and/or are "out-of-order". However, any memory access request that does not fall foul of these requirements can, as will be appreciated by those skilled in the art, preferably be, and preferably is, serviced (processed) by the memory management unit as normal.

Thus, in a particularly preferred embodiment, the memory management unit includes means for, or its operation includes a step of, if the necessary address association data is stored in the cache memory when the memory access request is received (and, preferably, if the memory access request is not out-of-order (is determined to be in order)), performing the required address translation and allowing the memory access to proceed (to complete).

The technology described in this application can be used whenever memory management arrangements use memory management units for processing memory access requests, and, for example, in any system connected to a bus that requires or uses a memory management unit.

As will be appreciated from the above, the technology described in this application will be particularly applicable in and to systems where greater latency of serving individual memory access requests can be accepted, and, e.g., where overall throughput is important, since it will tend to increase throughput but at the expense of greater latency.

An example of a system where throughput at the expense of latency is preferred is a graphics (a 3D graphics) processing system. Thus, a particularly preferred but still example embodiment may be implemented in and for a graphics processing system. Similarly, the technology described in this application extends to and includes a graphics processing system, and a method of operating a graphics processing system.

The methods may be implemented at least partially using software, e.g., computer programs. Thus further aspects include: computer software specifically adapted to carry out a method or the methods herein described when installed on a data processor, a computer program element comprising computer software code portions for performing a method or the methods herein described when the program element is run on a data processor, and a computer program code adapted to perform all the steps of a method or of the methods herein described when the program is run on a data-processing system.

A computer software carrier comprises such software which when used to operate a memory management arrangement comprising a data processor causes in conjunction with said data processor said arrangement to carry out the steps of a method or of the methods described above. Such a computer software carrier could be a physical storage medium such as a ROM chip, CD ROM or disk.

It will further be appreciated that not all steps of the methods need be carried out by computer software.

The technology may suitably be embodied as a computer program product for use with a computer system. Such an implementation may comprise a series of computer readable instructions fixed on a tangible medium, such as a computer readable medium, for example, diskette, CD-ROM, ROM, or hard disk, or transmittable to a computer system, via a modem or other interface device, over either a tangible medium, including but not limited to optical or analogue communications lines, or intangibly using wireless techniques, including but not limited to microwave, infrared or other transmission techniques. The series of computer readable instructions embodies all or part of the functionality previously described herein.

Those skilled in the art will appreciate that such computer readable instructions can be written in a number of programming languages for use with many computer architectures or operating systems. Further, such instructions may be stored using any memory technology, present or future, including but not limited to, semiconductor, magnetic, or optical, or transmitted using any communications technology, present or future, including but not limited to optical, infrared, or microwave. It is contemplated that such a computer program product may be distributed as a removable medium with accompanying printed or electronic documentation, for example, shrink-wrapped software, pre-loaded with a computer system, for example, on a system ROM or fixed disk, or distributed from a server or electronic bulletin board over a network, for example, the Internet or World Wide Web.

A number of preferred, non-limiting, and example embodiments will now be described by way of example only and with reference to the accompanying drawings, in which:

FIG. 1 shows schematically a memory management arrangement.

As shown in FIG. 1, the memory management arrangement includes a memory management unit 1, a cache memory 2 and a queue arrangement 3.

The cache memory 2 is in the present embodiment in the form of a translation lookaside buffer, and stores, as is known in the art, recently used memory page table elements which denote associations between virtual addresses used in memory access requests and the physical addresses used by the memory system. It also stores access control attributes for the access control features of the memory management unit.

The replay queue 3 is a first-in, first-out (FIFO) buffer which, as discussed below, can queue failed memory access requests and return them as inputs to the memory management unit 1 via the bus 5 for retrying through the memory management unit at a later time.

The memory management unit 1 has the twin tasks of address translation and memory protection. It receives memory access requests from other units of the microprocessor system (access initiators) 4 via a communications bus 5 and processes those memory access requests in order to check if the access should be allowed and to translate the address from the virtual address used in the memory access request to the physical address used by the memory system.

In order to carry out the necessary address translations, the memory management unit will use the address association data which is stored in the cache memory 2. If the relevant address data is present in the cache memory 2 (and the access request is not otherwise disallowed (e.g. by access control attributes), the memory management unit 1 will use that data to complete (service) the memory access request, and send the access to, e.g., a system bus 6 (e.g. to a memory system coupled to the system bus).

(If the memory access request cannot be completed because it is not allowed to be completed, e.g., due to any memory protection configuration, then the MMU signals this error.)

However, if an access request received by the memory management unit 1 requires address data (a page table entry) that is not currently stored in the cache 2, then the memory management unit 1 will, as is known in the art, fetch the relevant address data from other memory. The memory access request cannot complete (i.e. the memory management unit cannot perform the necessary address translation) until the required address data has been read and loaded into the cache 2.

In the present embodiment, if such a cache "miss" occurs, instead of blocking memory access requests until the required address data has been loaded into the cache 2, the memory management unit 1 operates to place the failed memory access request in the replay queue 3, and allows subsequent memory access requests to continue.

This process is repeated for each memory access request that the memory management unit 1 receives.

The queue 3 stores in respect of each memory access request that it is queuing, the virtual address to which the memory access request relates, a requestor ID (to be used to ensure data is returned to the right requester and for ordering requirement purposes), the size of the memory access request (in the present embodiment, a memory access request can cover from a single byte up to 64 bytes), and whether the access is a read or write access. The queue 3 can store (queue) 32 memory access requests.

Other arrangements would, of course, be possible.

In the present embodiment, the failed memory access requests placed in the queue 3 are continuously circulated through the memory management unit 1 from the queue alternately with new memory access requests from other access initiators 4. This is done by sending the memory access requests in the queue 3 as inputs to the memory management unit 1 via the bus 5 one after another in turn from the head of the queue, in a first-in-out basis (i.e. in a serial manner), alternately with new memory access requests for other access initiators 4.

This is carried out whenever there are failed memory access requests in the queue 3, unless the queue 3 is full of memory access requests, in which case memory access requests from the queue 3 are sent back to the memory management unit 1 from the queue 3 as a priority (i.e. not alternately with new memory access requests), until such time as there is again space in the queue 3 for new "failed" memory access requests.

Any retried memory access request that still fails when it is passed to the memory management unit (e.g. because the cache memory 2 still does not contain the address association data needed to allow that memory access request to complete) is placed again at the end of the queue 3 for retrying later.

Other arrangements would, of course, be possible.

For example, the failed memory access requests placed in the queue 3 could be queued in the queue 3 until such time as new address association data (e.g. a new page table entry) is loaded into the cache memory 2, and then, once the new address association data has been loaded in the cache memory 2, retried through the memory management unit 1 (e.g. either continuously, one-after-another, or alternately with new memory access requests from other access initiators 4).

In this case, once all the queued, previously failed memory access requests have been tried through the memory management unit 1 once, the queued, failed memory access requests are preferably again queued in the queue 3 until such time as new address association data is loaded into the cache memory 2, at which point the queue is sent to the memory management unit 1 once again, and so on.

As discussed above, if a memory access request experiences a cache miss, then the memory management unit is operable to fetch the relevant address data (e.g. page-table entries) from other memory. In the present embodiment, the memory management unit is configured such that if any given memory access request is retried before the relevant address association data is available in the cache memory, then that does not trigger the fetching of the same address association data again. This is achieved by the memory management unit making a check whether the address association data in question has already been requested (but not received) or not. Other arrangements such as allowing requests for the same address association data to be made, but then merging or in some other way handling, the identical address association data in the cache could be used, if desired.

The present embodiment also limits how fast address association data can be replaced in the cache memory, so as to help avoid the possibility of fetched data being replaced by other, new data, before it is used to service the memory access request that triggered the fetching of the initial data.

The present embodiment also includes a mechanism (not shown) for maintaining the order of the memory access requests. This is to allow for partial memory access request ordering restrictions, for example as imposed by the AMBA AXI bus system. In that system, memory access requests are grouped into given sets which each have a given identifier (ID), and it is necessary to maintain the order of the memory access requests within a given set of memory access requests, although the separate sets of memory access requests are independent of each other.

In order to handle such memory access request ordering restrictions, the memory management unit arrangement of the present embodiment further includes pairs of entry and exit counters, one pair for each different set of memory access requests (IDs) that might be expected to have to be handled at any one time. These counters are then operated as follows in order to preserve the memory access request ordering.

Firstly, upon receipt of a given memory access request, the set of memory access requests (the ID) to which the request relates is determined, and the memory access request is then tagged with the current entry counter value for that memory access request set (ID) as it enters the memory management unit. The entry counter is then incremented. This effectively tags each memory access request in the set with its number in the memory access request sequence (order).

The corresponding exit counter for the set of memory access requests (ID) in question is similarly used to count memory access requests as they complete and exit the memory management unit 1. Thus, if a memory access request for the set completes (exits the memory management unit), the exit counter for that set of memory access requests is incremented.

The memory management unit compares the count value tagged to a current memory access request that it is to process with the current exit counter value for the set of memory access requests in question, to determine whether the current memory access request is out of order or not.

If the current memory access request can be completed by the memory management unit and its tagged counter value when compared with the appropriate exit counter value shows that it is in its correct place in the order, then the memory access request is allowed to complete and the exit counter is incremented.

On the other hand, if the memory access request can successfully complete, but the comparison of the exit counter value and the memory access request's tagged counter value shows that the memory access request is out of order, the memory management unit does not complete the memory access request, but instead sends the memory access request to the retry queue 3 so as to defer its completion, from where it will be retried as discussed above in due course. (If the current memory access request fails anyway because of a cache miss, it will be sent to the retry queue 3 in any event.)

This mechanism can accordingly be used to ensure that the memory access requests are only allowed to complete in the correct order. The maximum counter values are preferably larger than the total number of memory access requests that can exist within the memory management unit including the retry queue 3 at any one time, so as to help ensure this.

It can be seen from the above that the technology described in this application provides a relatively simple and inexpensive system and method for allowing a memory management unit to keep working even when it is unable to immediately answer some memory access requests. This is achieved using a low cost, serial queuing mechanism for handling cache misses.

The invention claimed is:

1. A method of operating a memory management unit in a microprocessor memory system, in which the memory management unit acts to translate virtual addresses used in memory accesses to physical addresses used by the microprocessor memory system and has access to a cache memory storing associations between virtual addresses and physical addresses for this purpose, the method comprising:

the memory management unit:
receiving a memory access request;
determining whether address association data for performing an address translation required for the memory access request is stored in the cache memory;
if the address association data is not stored in the cache memory, placing the memory access request in a first-in, first-out queue at the end of the first-in, first-out queue, for later return to the memory management unit for processing; and
returning memory access requests placed in the first-in, first-out queue to the memory management unit for processing in serial order from a head of the first-in, first-out queue;
wherein when the memory management unit receives a memory access request returned from the head of the first-in, first-out queue for processing, the memory management unit:
determining whether address association data for performing an address translation required for the memory access request is stored in the cache memory;
if the address association data is not stored in the cache memory, placing the memory access request back in the first-in, first-out queue at the end of the first-in, first-out queue so that the memory access request must reach the head of the queue before the memory access request will be tried again; and
if the address association data stored in the cache memory, completing the memory access request.

2. The method of claim 1, comprising storing in respect of any queued memory access, the memory address in the access, together with one or more other attributes of the access.

3. The method of claim 1, comprising selecting either a queued memory access request awaiting retrying, or a new memory access request sent to the memory management unit, for providing to the memory management unit for processing.

4. The method of claim 1, comprising providing memory accesses to the memory management unit from the first-in, first-out queue alternately with the provision of new memory accesses to the memory management unit.

5. The method of claim 4, comprising providing memory accesses to the memory management unit from the first-in, first-out queue in preference to new memory access requests from other access requestors if the queue is full.

6. The method of claim 1, comprising only returning queued memory access requests to the memory management unit for retrying once a new set of address association data has been loaded in the cache memory.

7. The method of claim 1, comprising the memory management unit determining if a memory access request it receives for processing would be completed in a correct order if it were to be completed by the memory management unit, and, if it determines that the completion of the memory access request would not be in the correct order, not completing the memory access request, but instead placing it in the first-in, first-out queue to be tried again later.

8. A method of operating a memory management unit in a microprocessor memory system, in which the memory management unit acts to translate virtual addresses used in memory accesses to physical addresses used by the microprocessor memory system and has access to a cache memory storing associations between virtual addresses and physical addresses for this purpose, the method comprising:

the memory management unit:
receiving a memory access request;
determining if the memory access request would be completed in a correct order if it were to be completed by the memory management unit;

if it is determined that the completion of the memory access request would not be in the correct order, placing the memory access request in a first-in, first-out queue at the end of the first-in, first-out queue for later return to the memory management unit;

returning memory access requests placed in the first-in, first-out queue to the memory management unit for processing in serial order from a head of the first-in, first-out queue;

wherein the memory management unit, when receiving a memory access request returned from the head of the first-in, first-out queue for processing, determines if the memory access request would be completed in a correct order if it were to be completed by the memory management unit;

if the memory management unit determines that the completion of the memory access request would not be in the correct order, the memory management unit places the memory access request back in the first-in, first-out queue at the end of the first-in, first-out queue so that the memory access request must reach the head of the queue before the memory access request will be tried again; and if the memory management unit determines that the completion of the memory access request would be in the correct order, the memory management unit completes the memory access request.

9. The method of claim 1, comprising, for a given set of memory access requests that have to be performed in order, tagging each memory access request in the set with its number in the order in the set when it is received at the memory management unit, and monitoring the number of the last completed memory access request in the set.

10. The method of claim 1, wherein the microprocessor system is a graphics processing system.

11. A memory management unit arrangement for a microprocessor memory system, comprising:
    a memory management unit for translating virtual addresses used in memory access requests to physical addresses used by the microprocessor memory system;
    a cache memory for storing associations between virtual addresses and physical addresses for use by the memory management unit when translating virtual addresses used in memory access requests to physical addresses used by the memory system; and
    a first-in, first-out queue arrangement for receiving and queuing memory access requests from the memory management unit and configured to return requests in the first-in, first-out queue to the memory management unit for processing in serial order from a head of the first-in, first-out queue; wherein:
    the memory management unit further comprises:
    processing logic operable to determine whether address association data for performing an address translation required for a memory access request is stored in the cache memory;
    processing logic operable to, if the address association data is not stored in the cache memory, place the memory access request in the first-in, first-out queue at the end of the first-in, first-out queue for later return to the memory management unit for processing; and
    processing logic operable, when a memory access request returned from the head of the first-in, first-out queue is received for processing, to:
        determine whether address association data for performing an address translation required for the memory access request is stored in the cache memory:
        if the address association data is not stored in the cache memory, place the memory access request back in the first-in, first-out queue at the end of the first-in, first-out queue so that the memory access request must reach the head of the queue before the memory access request will be tried again; and
        if the address association data is stored in the cache memory, complete the memory access request.

12. The arrangement of claim 11, wherein the first-in, first-out queue is coupled to the same input bus as other access requesters for the memory management unit.

13. The arrangement of claim 11, in which the first-in, first-out queue stores in respect of a queued memory access, the memory address in the access.

14. The arrangement of claim 11, comprising processing logic operable to select either a queued memory access request awaiting retrying, or a new memory access request sent to the memory management unit, for providing to the memory management unit for processing.

15. The arrangement of claim 11, comprising processing logic operable to provide memory accesses to the memory management unit from the first-in, first-out queue alternately with the provision of new memory accesses to the memory management unit.

16. The arrangement of claim 11, comprising processing logic operable to provide memory accesses to the memory management unit from the first-in, first-out queue in preference to new memory access requests from other access requestors if the queue is full.

17. The arrangement of claim 11, comprising processing logic operable to only return queued memory access requests to the memory management unit for retrying once a new set of address association data has been loaded in the cache memory.

18. The arrangement of claim 11, comprising processing logic operable to determine if a memory access request the memory management unit receives for processing would be completed in a correct order if it were to be completed by the memory management unit, and operable to, if it is determined that the completion of the memory access request would not be in the correct order, place the memory access request in the first-in, first-out queue to be returned to the memory management unit later.

19. A memory management unit arrangement for a microprocessor memory system, comprising:
    a memory management unit for translating virtual addresses used in memory access requests to physical addresses used by the microprocessor memory system;
    a cache memory for storing associations between virtual addresses and physical addresses for use by the memory management unit when translating virtual addresses used in memory access requests to physical addresses used by the memory system; and
    a first-in, first-out queue arrangement for receiving and queuing memory access requests from the memory management unit and configured to return requests in the first-in, first-out queue to the memory management unit for processing in serial order from a head of the first-in, first-out queue; wherein:
    the memory management unit further comprises:
    processing logic configured to determine if a memory access request would be completed in a correct order if it were to be completed by the memory management unit; and
    processing logic configured to, if it is determined that the completion of the memory access request would not be in the correct order, place the memory access request in the first-in, first-out queue at the end of the first-in, first-out queue for later return to the memory management unit; and processing logic configured, when a memory access request returned from the head of the first-in, first-out queue is received for processing, to:
- determine if the memory access request would be completed in a correct order if it were to be completed by the memory management unit;
- if it is determined that the completion of the memory access request would not be in the correct order, place the memory access request back in the first-in, first-out queue at the end of the first-in, first-out queue so that the memory access request must reach the head of the queue before the memory access request will be tried again; and if it is determined that the completion of the memory access request would be in the correct order, complete the memory access request.

20. The apparatus of claim 11, comprising means for, for a given set of memory access requests that have to be performed in order, tagging each memory access request in the set with its number in the order in the set when it is received at the memory management unit, and means for monitoring the number of the last completed memory access request in the set.

21. A graphics processing system comprises the memory management unit arrangement of claim 11.

22. A graphics processing system comprises the memory management unit arrangement of claim 19.

23. A non-transitory computer program product comprising computer software specifically adapted to carry out the method of claim 1 when installed on a data processor.

24. A non-transitory computer program product comprising computer software specifically adapted to carry out the method of claim 8 when installed on a data processor.

* * * * *